(12) United States Patent
Wang et al.

(10) Patent No.: US 9,408,101 B2
(45) Date of Patent: Aug. 2, 2016

(54) METHOD AND DEVICE FOR CELL OUTAGE DETECTION

(71) Applicant: HUAWEI TECHNOLOGIES CO., LTD., Shenzhen, Guangdong (CN)

(72) Inventors: Jun Wang, Shanghai (CN); Xuelong Wang, Beijing (CN); Haitao Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 14/058,533

(22) Filed: Oct. 21, 2013

(65) Prior Publication Data

US 2014/0043998 A1    Feb. 13, 2014

Related U.S. Application Data

(63) Continuation of application No. PCT/CN2012/074376, filed on Apr. 19, 2012.

(30) Foreign Application Priority Data

Apr. 20, 2011 (CN) .......................... 2011 1 0099309

(51) Int. Cl.
*H04W 24/10* (2009.01)
*H04W 24/08* (2009.01)
*H04W 24/04* (2009.01)

(52) U.S. Cl.
CPC .............. *H04W 24/10* (2013.01); *H04W 24/08* (2013.01); *H04W 24/04* (2013.01)

(58) Field of Classification Search
CPC ...... H04W 24/10; H04W 24/08; H04W 24/04
See application file for complete search history.

(56) References Cited

U.S. PATENT DOCUMENTS

2009/0122730 A1* 5/2009 Yang et al. .................... 370/280
2009/0196305 A1   8/2009 Yoon
(Continued)

FOREIGN PATENT DOCUMENTS

CN       101594622 A    12/2009
CN       101796864 A     8/2010
(Continued)

OTHER PUBLICATIONS

International Search Report, dated Jul. 19, 2012, in corresponding International Application No. PCT/CN2012/074376 (6 pp.)
(Continued)

*Primary Examiner* — Brian D Nguyen
(74) *Attorney, Agent, or Firm* — Staas & Halsey LLP

(57) ABSTRACT

Embodiments of the present invention provide a method and a device for cell outage detection. The method includes: receiving, by a controlling base station of a first cell, a request message, where the request message is used to request an outage measurement on a second cell, the first cell is a neighboring cell of the second cell; selecting, by the controlling base station of the first cell, a user equipment in the first cell to measure the second cell; receiving, by the controlling base station of the first cell, measurement information obtained by the user equipment by measuring the second cell, and generating, according to the measurement information, information used to determine whether an outage occurs in the second cell; and sending, by the controlling base station of the first cell, a reply message including the information used to determine whether an outage occurs in the second cell.

19 Claims, 4 Drawing Sheets

(56) References Cited

U.S. PATENT DOCUMENTS

| | | | |
|---|---|---|---|
| 2010/0014429 A1* | 1/2010 | Kim et al. | 370/241 |
| 2010/0020710 A1* | 1/2010 | Gupta et al. | 370/252 |
| 2010/0056135 A1 | 3/2010 | Kurokochi et al. | |
| 2010/0159932 A1* | 6/2010 | Park et al. | 455/436 |
| 2010/0254274 A1* | 10/2010 | Westerberg et al. | 370/252 |
| 2010/0331025 A1* | 12/2010 | Kallin et al. | 455/500 |
| 2011/0142004 A1* | 6/2011 | Bae et al. | 370/331 |
| 2011/0171915 A1* | 7/2011 | Gomes et al. | 455/73 |
| 2011/0237269 A1* | 9/2011 | Chen | 455/450 |

FOREIGN PATENT DOCUMENTS

| | | |
|---|---|---|
| EP | 2139278 | 12/2009 |
| EP | 2154918 | 2/2010 |
| JP | 2009-182538 | 8/2009 |
| JP | 2010-62633 | 3/2010 |
| WO | 2006/063309 | 6/2006 |
| WO | 2010/093306 A1 | 8/2010 |

OTHER PUBLICATIONS

Blankenhorn, Christian, Matthias Kaschub, Christian M. Mueller, and Stephan Wanke. *A Cell Outage Detection Algorithm using Neighbor Cell List Reports*. Institute of Communication Networks and Computer Engineering, University of Stuttgart. Stuttgart, Germany. Dec. 2008.

*3rd Generation Partnership Project; Technical Specification Group Services and System Aspects; Telecommunication management; Self-Organizing Networks (SON); Self-healing concepts and requirements (Release 10)*. Technical Specification: 3GPP TS 32.541 V1.7.0 (Jan. 2011). 3rd Generation Partnership Project. Valbonne, France. 2010.

International Search Report issued Jul. 19, 2012, in corresponding International Patent Application No. PCT/CN2012/074376.

Extended European Search Report dated Mar. 27, 2014 in corresponding European Patent Application No. 12773680.9.

"Potential solutions for self healing", Huawei, 11.2, 3GPP TSG-RAN WG3 #75, Dresden, Germany, Feb. 2012, pp. 1-3.

"Clarification of Self-healing at RAN", Huawei, Telefonica, Orange, 11.6, 3GPP TSG RAN WG3 Meeting #74, San Francisco, Nov. 14-18, 3pp.

Chinese Office Action dated May 6, 2014 in corresponding Chinese Patent Application No. 201110099309.7.

Chinese Search Report dated Apr. 21, 2014 in corresponding Chinese Patent Application No. 201110093097.

Japanese Office Action mailed Oct. 7, 2014 in corresponding Japanese Patent Application No. 2014-505499.

Office Action mailed May 19, 2015 for corresponding Japanese Patent Application No. 2014-505499.

\* cited by examiner

METHOD AND DEVICE FOR CELL OUTAGE DETECTION

CROSS-REFERENCE TO RELATED APPLICATIONS

This application is a continuation of International Application No. PCT/CN2012/074376, filed on Apr. 19, 2012, which claims priority to Chinese Patent Application No. 201110099309.7, filed on Apr. 20, 2011, both of which are hereby incorporated by reference in their entireties.

TECHNICAL FIELD

Embodiments of the present invention relate to the field of wireless communications, and in particular, to a method and a device for cell outage detection.

BACKGROUND

A self-organizing network (Self-Organizing Network, SON) is a critical type of standardization work engaged by a 3rd generation partnership project (The 3rd Generation Partnership Project, 3GPP) standard organization in an R8/9/10 working period, and its core idea is to reduce traditional manual operations by using an automation process at phases of network planning, deployment, optimization, and maintenance, and to reduce maintenance costs of network operators.

A communication cell has an abnormal working state. A cell in this state is unable to provide normal communication services, and a user equipment (User Equipment, UE) residing in this cell cannot establish a communication connection, or a user equipment in an ongoing communication in this cell is disconnected due to the lack of ability to maintain the communication connection. In addition, a cell is in this abnormal working state not because an energy-saving operation is performed in the cell but because a severe failure occurs in the cell. Cells in this case are called outage cells. A system needs a capability of cell outage detection automatically to trigger an outage cell recovery operation or an energy-saving cell deactivating operation, to make the cell return to a normal working state. This automation process of cell outage detection belongs to a self healing (Self Healing, SH) category of the self-organizing network.

Currently, most of methods for cell outage detection are implemented inside a base station. Cyclic detection is performed on specific software and hardware inside the base station, an external power supply system or network connections to determine whether a cell outage failure occurs, and the base station reports a cell outage alarm. This method is strongly correlated with the implementation of the base station, and is limited to the base station only. Another enhanced method is that a network management system periodically collects key performance indicators (Key Performance Indicators, KPIs) and/or performance measurements (PM, Performance Measurements) of the cell; if a performance indicator, such as a radio resource control (Radio Resource Control, RRC) connection setup success rate, or a disconnection or call drop rate (hereinafter referred to as "disconnection/call drop rate") of the cell exceeds a preset threshold within one or several reporting periods, the network management system considers that an outage failure occurs in the cell. These methods all consider the base station only, which may lead to a consequence that a cell has been in an outage state for a long time without being known, so that the time used to determine an outage cell is prolonged or the probability of misjudging an outage cell is increased, thereby greatly degrading the service experience of a user.

SUMMARY

Embodiments of the present invention provide a method and a device for cell outage detection, so that an outage cell can be detected on a real-time basis.

In one aspect, the present invention provides a method for cell outage detection, including: receiving, by a controlling base station of a first cell, a request message, where the request message is used to request an outage measurement on a second cell, where the first cell is a neighboring cell of the second cell; selecting, by the controlling base station of the first cell according to the request message, a user equipment in the first cell to measure the second cell; receiving, by the controlling base station of the first cell, measurement information obtained by the user equipment by measuring the second cell, and generating, according to the measurement information, information used to determine whether an outage occurs in the second cell; and sending, by the controlling base station of the first cell, a reply message, where the reply message includes the information used to determine whether an outage occurs in the second cell.

In another aspect, the present invention provides a method for cell outage detection, including: sending a request message to a controlling base station of a first cell when a second cell becomes a potential outage cell, where the request message is used to request an outage measurement on the second cell, so that the controlling base station of the first cell selects a user equipment in the first cell to measure the second cell and generates, according to measurement information obtained through the measurement, information used to determine whether an outage occurs in the second cell, where the first cell is a neighboring cell of the second cell; receiving a reply message sent by the controlling base station of the first cell, where the reply message includes the information used to determine whether an outage occurs in the second cell; and determining, according to the information used to determine whether an outage occurs in the second cell, whether an outage occurs in the second cell.

In another aspect, the present invention provides a base station, where the base station is a controlling base station of a first cell and includes: a first receiving unit, configured to receive a request message, where the request message is used to request an outage measurement on a second cell, where the first cell is a neighboring cell of the second cell; a selecting unit, configured to select, according to the request message, a user equipment which is in the first cell and measures the second cell; a second receiving unit, configured to receive measurement information obtained by the user equipment by measuring the second cell; a generating unit, configured to generate, according to the measurement information, information used to determine whether an outage occurs in the second cell; and a sending unit, configured to send a reply message, where the reply message includes the information used to determine whether an outage occurs in the second cell.

In another aspect, the present invention provides a network device, including: a sending unit, configured to: send a request message to a controlling base station of a first cell when a second cell becomes a potential outage cell, where the request message is used to request an outage measurement on the second cell, so that the controlling base station of the first cell selects a user equipment in the first cell to measure the second cell and generates, according to measurement information obtained through the measurement, information used to determine whether an outage occurs in the second cell, where the first cell is a neighboring cell of the second cell; a first receiving unit, configured to receive a reply message sent by the controlling base station of the first cell, where the reply message includes the information used to determine whether an outage occurs in the second cell; and a processing unit, configured to determine, according to the information used to determine whether an outage occurs in the second cell, whether an outage occurs in the second cell.

In the embodiments of the present invention, a user equipment of the first cell (that is, a neighboring cell of the second cell) measures the second cell (that is, the target cell), and the controlling base station of the first cell returns, according to the measurement result of the user equipment, information used to determine whether an outage occurs in the second cell. In this way, by using an auxiliary measurement result of the neighboring cell, outage detection on the target cell is implemented in real time, thereby increasing the efficiency and accuracy of outage cell detection.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
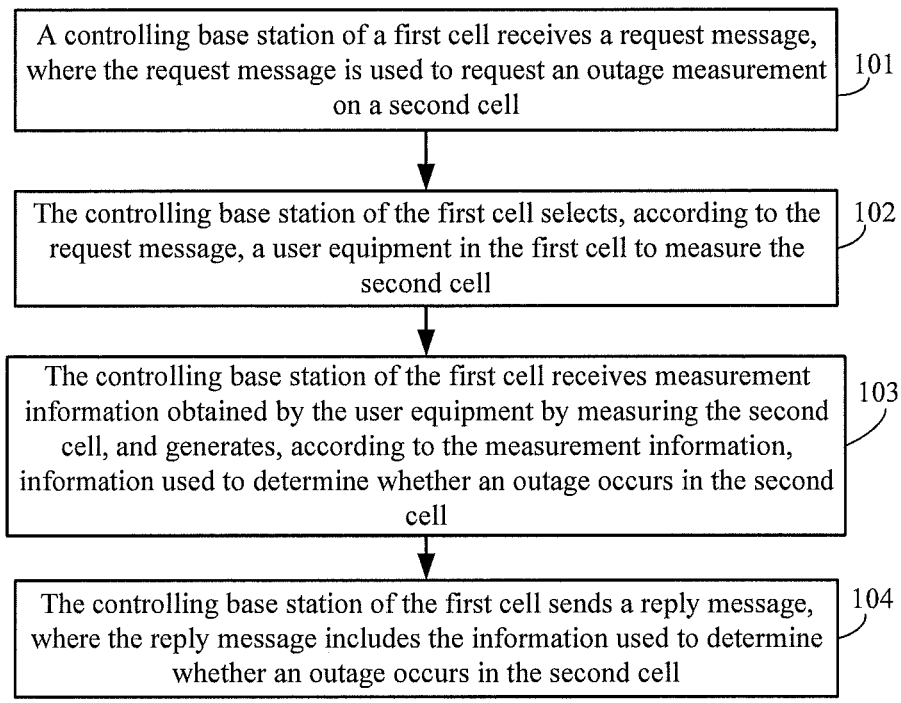
FIG. 1 is a flowchart schematic of a method for cell outage detection according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communication systems, for example, a global system of mobile communication (Global System of Mobile communication, GSM) system, a code division multiple access (Code Division Multiple Access, CDMA) system, a wideband code division multiple access wireless (Wideband Code Division Multiple Access Wireless, WCDMA) system, a time division-synchronous code division multiple access (Time Division-Synchronous Code Division Multiple Access, TD-SCDMA) system, a general packet radio service (General Packet Radio Service, GPRS) system, a long term evolution (Long Term Evolution, LTE) system, and the like.

A user equipment (User Equipment, UE) in the embodiments of the present invention may be a mobile terminal (Mobile Terminal) that can communicate with one or multiple core networks through a radio access network (Radio Access Network), RAN. The mobile terminal may be a mobile phone (or called a "cellular" phone), or a computer equipped with a mobile terminal, for example, a portable, pocket, handheld, computer-embedded, or vehicle-mounted mobile device, which exchanges speeches and/or data with the radio access network.

A base station in the embodiments of the present invention may be a base station (Base Transceiver Station, BTS) in GSM or CDMA, or a base station (NodeB) in WCDMA or TD-SCDMA, or an evolved base station (evolved NodeB, eNB or e-NodeB) in LTE, which is not limited by the present invention.

Detection of an outage cell is a complex function involving collection of a plurality of aspects of information and comprehensive judgment. To increase the accuracy of detection, information assisting in judgment making needs to be increased from different aspects to reduce the probability of misjudgment. A method for cell outage detection provided in an embodiment of the present invention is as follows: a target cell (that is, a cell where a cell outage measurement needs to be performed) initiates an auxiliary measurement to a neighboring cell on demand (on demand), and whether an outage occurs in the target cell is determined according to an auxiliary measurement result of the neighboring cell. This method is triggered under the premise that a controlling base station of the target cell determines preliminarily, according to information collected by the controlling base station, that an outage failure may probably occur in the target cell, that is, the target cell becomes a potential outage cell.

FIG. 1 is a flowchart schematic of a method for cell outage detection according to an embodiment of the present invention. In this embodiment, a first cell and a second cell may be intra-frequency cells, inter-frequency cells or inter-system cells.

101. A controlling base station of the first cell receives a request message, where the request message is used to request an outage measurement on the second cell, where the first cell is a neighboring cell of the second cell.

102. The controlling base station of the first cell selects, according to the request message, a user equipment in the first cell to measure the second cell.

103. The controlling base station of the first cell receives measurement information obtained by the user equipment by measuring the second cell, and generates, according to the measurement information, information used to determine whether an outage occurs in the second cell.

104. The controlling base station of the first cell sends a reply message, where the reply message includes the information used to determine whether an outage occurs in the second cell.

In each embodiment of the present invention, because the second cell is the target of the outage measurement, that is, cell outage detection needs to be performed on the second cell, the second cell may also be called a "target cell"; and because the first cell is a neighboring cell of the second cell, the first cell may be called a "neighboring cell".

Alternatively, as an embodiment, the foregoing request message may be initiated by a controlling base station of the foregoing second cell (that is, the target cell). For example, in 101, the controlling base station of the first cell receives the foregoing request message sent by the controlling base station of the second cell; and in 104, the controlling base station of the first cell sends the foregoing reply message to the controlling base station of the second cell.

Alternatively, as another embodiment, the foregoing request message may also be initiated by a network management system independent of a base station for coordinating auxiliary measurement processes of neighboring cells. For example, an operation, administration, and maintenance (Operations Administration and Maintenance, OAM) system coordinates auxiliary measurement processes of neighboring cells on a unified basis in outage cell detection. For example, in 101, the controlling base station of the first cell receives the foregoing request message sent by a network management system; and in 104, the controlling base station of the first cell sends the foregoing reply message to the foregoing network management system.

Alternatively, as an embodiment, the request message in each of the foregoing embodiments may include one or more pieces of the following information: an identifier of the second cell, a longest measurement period, and a measurement item requested to be performed.

Alternatively, as an embodiment, in each of the foregoing embodiments, the controlling base station of the first cell may select, from the first cell, a user equipment adjacent to the cell edge of the second cell to measure the second cell.

Alternatively, as an embodiment, in each of the foregoing embodiments, the controlling base station of the first cell may further acquire handover performance measurement information of the second cell, where the handover performance measurement information of the second cell includes one or more pieces of the following information: the number of handover requests with respect to the second cell, the number of successful handovers with respect to the second cell, a disconnection/call drop rate of the second cell. The controlling base station of the first cell further generates, according to the foregoing measurement information and the handover performance measurement information of the second cell, the information used to determine whether an outage occurs in the second cell. When the controlling base station of the first cell generates the information used to determine whether an outage occurs in the second cell, on the basis of consideration of the measurement information reported by the user equipment in the first cell, the controlling base station of the first cell further considers the handover performance measurement information of the second cell. Therefore, the generated information used to determine whether an outage occurs in the second cell is more accurate.

Alternatively, as an embodiment, in each of the foregoing embodiments, the measurement information obtained by the user equipment by measuring the second cell includes measurement information obtained by the user equipment by measuring a reference signal receiving power signal of the second cell or measurement information obtained by the user equipment by detecting an uplink channel and a downlink channel of the second cell.

In the embodiment of the present invention, a user equipment in a neighboring cell (that is, the first cell) measures the target cell (that is, the second cell), and the controlling base station of the neighboring cell returns information used to determine whether an outage occurs in the target cell to the target cell according to a measurement result of the user equipment. In this way, the target cell implements, by using an auxiliary measurement result of the neighboring cell, outage detection on the target cell on a real-time basis, thereby increasing the efficiency and accuracy of outage cell detection.

Figure 2:
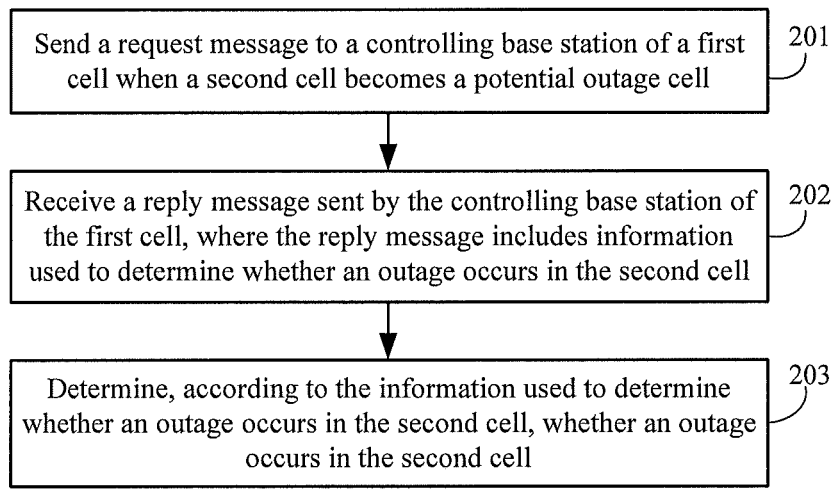
FIG. 2 is a flowchart schematic of a method for cell outage detection according to another embodiment of the present invention.

FIG. 2 is a flowchart schematic of a method for cell outage detection according to another embodiment of the present invention. In this embodiment, a first cell and a second cell may be intra-frequency cells, inter-frequency cells or inter-system cells.

201. Send a request message to a controlling base station of the first cell when the second cell becomes a potential outage cell, where the request message is used to request an outage measurement on the second cell, so that the controlling base station of the first cell selects a user equipment in the first cell to measure the second cell and generates, according to measurement information obtained through the measurement, information used to determine whether an outage occurs in the second cell, where the first cell is a neighboring cell of the second cell.

202. Receive a reply message sent by the controlling base station of the first cell, where the reply message includes the information used to determine whether an outage occurs in the second cell.

203. Determine, according to the information used to determine whether an outage occurs in the second cell, whether an outage occurs in the second cell.

Alternatively, as an embodiment, the foregoing 201 to 203 may be performed by the controlling base station of the second cell (that is, a target cell).

Alternatively, as another embodiment, the foregoing 201 to 203 may also be performed by a network management system. If the foregoing 201 to 203 are performed by the network management system, alternatively, the method embodiment illustrated in FIG. 2 further includes: receiving, by the network management system, indication information sent by the controlling base station of the second cell, where the indication information is used to indicate that the second cell becomes a potential outage cell; generating, by the network management system according to the indication information, a request message used to request an outage measurement on the second cell.

Alternatively, as an embodiment, the request message in each of the foregoing embodiments includes one or more pieces of the following information: an identifier of the second cell, a longest measurement period, and a measurement item requested to be performed.

In the embodiment of the present invention, a user equipment in a neighboring cell (that is, the first cell) measures the target cell (that is, the second cell), and the controlling base station of the neighboring cell returns information used to determine whether an outage occurs in the target cell to the target cell according to a measurement result of the user equipment. In this way, the target cell implements, by using an auxiliary measurement result of the neighboring cell, outage detection on the target cell on a real-time basis, thereby increasing the efficiency and accuracy of outage cell detection.

Figure 3:
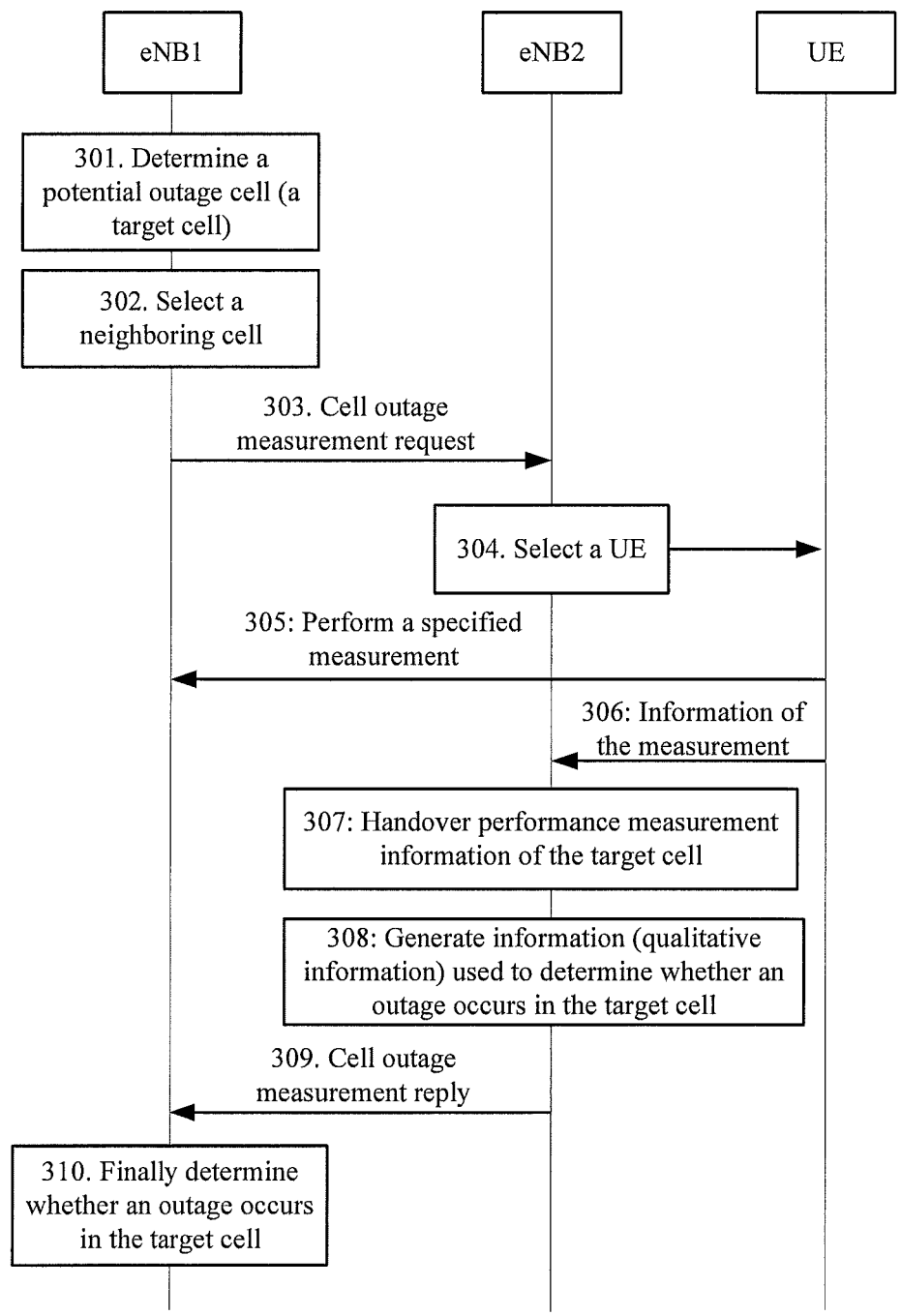
FIG. 3 is a flowchart schematic of a process of cell outage detection according to an embodiment of the present invention.

FIG. 3 is a flowchart schematic of a process of cell outage detection according to an embodiment of the present invention. In the embodiment illustrated in FIG. 3, eNB1 refers to a controlling base station of a target cell, eNB2 refers to a controlling base station of a neighboring cell of the target cell, and UE refers to a user equipment in the neighboring cell. The target cell in this embodiment corresponds to the second cell in the foregoing embodiment, and the neighboring cell (hereinafter referred to as "neighboring cell") of the target cell corresponds to the first cell in the foregoing embodiment.

Figure 6:
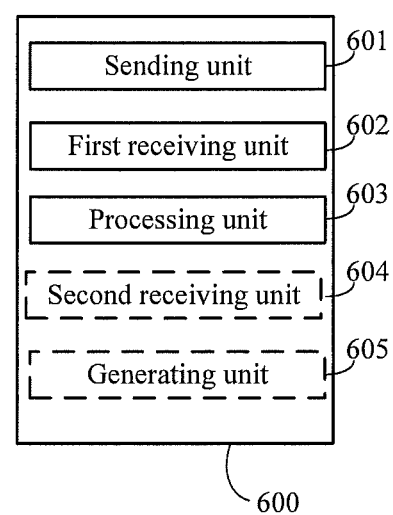
FIG. 6 is schematic block structural diagram of a network device according to an embodiment of the present invention.

It should be noted that mark numbers illustrated in FIG. 6 set no limitation to the scope of the embodiment of the present invention. For example, the controlling base station of the neighboring cell and the controlling base station of the target cell may belong to different systems, for example, one is an eNB, and the other is a NodeB. The neighboring cell and the target cell may be intra-frequency cells, inter-frequency cells or inter-system cells. In addition, although only one neighboring cell is illustrated in FIG. 3 for conciseness, the embodiment of the present invention is not limited thereto. The target cell may be measured by using user equipments in multiple neighboring cells. In addition, although only one UE in the neighboring cell is illustrated in FIG. 3 for conciseness, the embodiment of the present invention is not limited thereto. The target cell may be measured by using multiple UEs in the neighboring cell. All these variations shall fall into the scope of the embodiment of the present invention.

FIG. 3 is a process of cell outage detection under a distributed architecture. The process of cell outage detection is initiated by the controlling base station eNB1 of the target cell, and an auxiliary measurement task request is initiated to selected neighboring cells through a network interface (for example, an X2 interface). A controlling base station (that is, the eNB2) of each selected neighboring cell returns an execution result of a measurement task to the eNB1, and the eNB1 makes an outage detection judgment on the target cell according to a comprehensive result. If determining that a cell outage occurs in the target cell, the controlling base station eNB1 of the target cell generates a cell outage alarm.

301. The eNB1 determines that the target cell is a potential outage cell. For example, the eNB1 detects, by using an internal detection mechanism, that traffic of the target cell is 0 within a set reporting period. Specifically, whether the traffic of the cell is 0 may be determined comprehensively by measuring indicators of the cell in a reporting period such as the number of RRC connection attempts, an RRC connection setup success rate, the number of radio access bearer (Radio Access Bearer, RAB) setup attempts, an RAB setup success rate, the number of active users, a wireless call drop/disconnection rate. In this case, the eNB1 may generate an alarm or a notification indicating that the target cell becomes a potential outage cell, for example, "target cell unavailable".

302. The eNB1 selects, from a neighboring cell list of the target cell, a proper neighboring cell on which an auxiliary measurement needs to be performed. The criterion for selecting a neighboring cell is not limited. For example, a large quantity of UEs are handed over to a neighboring cell of the target cell during a recent period of time. The neighboring cell and the target cell may be intra-frequency cells, inter-frequency cells or inter-system cells.

303. The eNB1 sends a request message to a controlling base station eNB2 of the selected neighboring cell through an X2 interface or an inter-system network interface, where the request message includes one or more pieces of the following information: an identifier of the target cell, a longest measurement period, and a measurement item requested to be performed. The foregoing request message in this embodiment is exemplarily a "cell outage measurement request". For example, the "cell outage measurement request" may carry an identifier of the target cell (mandatory), a measurement item requested to be performed (optional, including a performance measurement of the target cell, a measurement performed by a UE in the target cell, and the like), and a longest measurement period (mandatory).

304. After receiving the foregoing "cell outage measurement request", the eNB2 selects a UE in the neighboring cell to implement an auxiliary outage measurement process on the target cell. The eNB selects a proper UE (for example, a UE located adjacent to a cell edge of the target cell), so that the UE performs a specified measurement item on the target cell in a specified period.

305. The selected UE in the neighboring cell performs a measurement process on the target cell. The measurement process includes but is not limited to: (a) measuring a reference signal receiving power (Reference Signal Receiving Power, RSRP) signal of the target cell; and (b) detecting an uplink channel and a downlink channel of the target cell, for example, checking the random access of the UE. An existing RRC message may be used as a signaling message of an air interface, for example, a radio bearer reconfiguration or physical channel reconfiguration process with a new information element added to a process message; or a new RRC message may be added to carry an information element required for the UE in the neighboring cell to perform auxiliary outage detection on the target cell.

306. Return information of the measurement performed by the UE in the specified period to the eNB2 through an air interface, where an existing RRC message may be used as a signaling message of the air interface.

307. The eNB2 further monitors the performance measurement item of the target cell to obtain handover performance measurement information of the target cell. The handover performance measurement information of the target cell includes one or more pieces of the following information: the number of handover requests with respect to the target cell, the number of successful handovers with respect to the target cell, and a disconnection/call drop rate of the target cell. For example, handover performance indicators of handover of the UE in the neighboring cell to the target cell include the number of attempts of handover to the target cell and a handover success rate within a set monitoring period. In FIG. 3, 307 is displayed after 304 to 306, but the embodiment of the present invention is not limited thereto. 307 may be performed before 304 to 306, or be performed concurrently with 304 to 306. 307 is an optional step.

308. The eNB2 generates, by using the measurement information returned by the UE, information used to determine whether an outage occurs in the target cell. If 307 is performed, the eNB2 generates, according to the foregoing measurement information and handover performance measurement information of the target cell, information used to determine whether an outage occurs in the target cell.

For example, so long as one UE includes the identifier of the target cell and a normal measured value (for example, an RSRP value) of the specified measurement item of the cell in a measurement result carried in the returned message, the neighboring cell ends the auxiliary measurement, and generates qualitative information used to determine that the target cell is a "non-outage" cell. If all selected UEs include the identifier of the target cell and an abnormal measured value (for example, an RSRP value) of the specified measurement item of the cell in a measurement result carried in the message returned after the expiration of the measurement period, the neighboring cell ends the auxiliary measurement, and generates qualitative information used to determine that the target cell is an "outage" cell. If the eNB2 further monitors the performance measurement item of the cell (same as 307), then in 308, the eNB2 may generate qualitative information according to the performance measurement item and the measurement information returned by the UE. For example, if a performance measurement indicator is 0 or close to 0 and the measurement result of the UE indicates qualitatively that the target cell is an "outage" cell, the eNB2 accordingly generates qualitative information used to determine that the target cell is an "outage" cell.

309. The eNB2 returns a "cell outage measurement reply" message to the eNB1 through the X2 interface or the inter-system network interface. The cell outage measurement reply message carries qualitative information of the auxiliary measurement of the neighboring cell, for example, outage or non-outage of the target cell.

310. The NB1 finally determines whether an outage occurs in the target cell by combining the cell outage measurement results (the qualitative information) reported by selected neighboring cells. For example, if all the selected neighboring cells return an indication indicating that an outage occurs in the target cell, the eNB1 determines that an outage occurs in the target cell and sends a corresponding alarm, for example, "target cell outage". Then, the process ends.

In the embodiment of the present invention, a user equipment in a neighboring cell (that is, the first cell) measures the target cell (that is, the second cell), and the controlling base station of the neighboring cell returns information used to determine whether an outage occurs in the target cell to the target cell according to a measurement result of the user equipment. In this way, the target cell implements, by using an auxiliary measurement result of the neighboring cell, outage detection on the target cell on a real-time basis, thereby increasing the efficiency and accuracy of outage cell detection.

Figure 4:
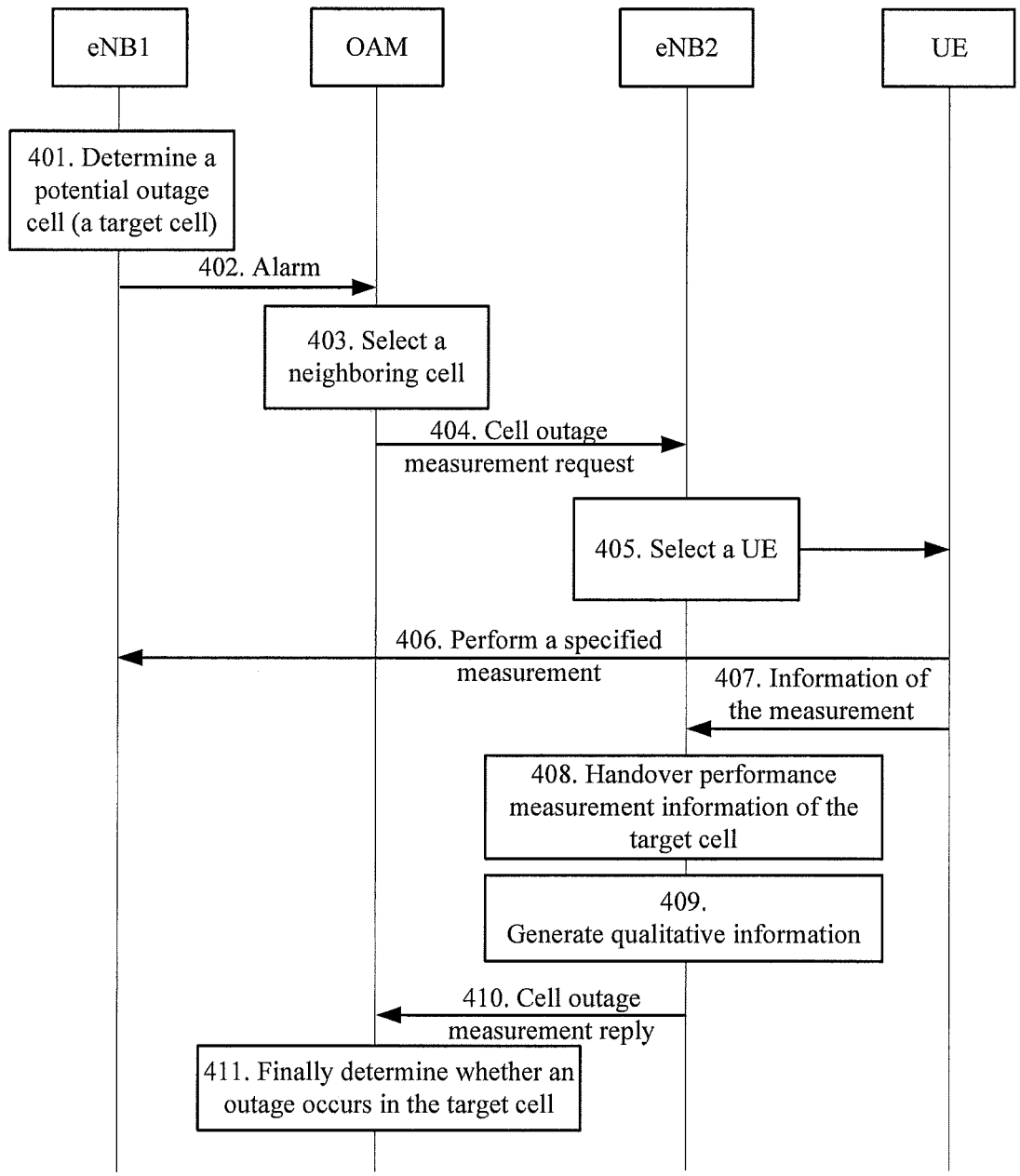
FIG. 4 is a flowchart schematic of a process of cell outage detection according to another embodiment of the present invention.

FIG. 4 is a flowchart schematic of a process of cell outage detection according to another embodiment of the present invention. In the embodiment illustrated in FIG. 4, a network management system is exemplarily an OAM, eNB1 refers to a controlling base station of a target cell, eNB2 refers to a controlling base station of a neighboring cell of the target cell, and UE refers to a user equipment in the neighboring cell. The OAM may be a network management system of a vendor, for example, an element management system (Element Management System, EMS), or an integrated network management system of an operator, for example, a network management system (Network Management System, NMS). The target cell in this embodiment corresponds to the second cell in the foregoing embodiment, and the neighboring cell (hereinafter referred to as "neighboring cell") of the target cell corresponds to the first cell in the foregoing embodiment.

FIG. 4 is a process of cell outage detection under a centralized architecture, where a network management system independent of a base station coordinates auxiliary measurement processes on a unified basis. The controlling base station eNB1 of the target cell preliminarily determines that the target cell is a potential outage cell and sends a corresponding alarm to the OAM; the OAM checks a neighboring cell list of the target cell, selects proper neighboring cells, and initiates an auxiliary measurement task request to the selected neighboring cells through a network management interface. Each of the selected neighboring cells returns an execution result of a measurement task to the OAM, and the OAM makes an outage detection judgment on the target cell according to a comprehensive result. If determining that a cell outage occurs in the target cell, the OAM sends a target cell outage alarm.

401. Same as 301 in FIG. 3, the eNB1 determines that a target cell is a potential outage cell. For example, the eNB1 detects, by using an internal detection mechanism, that traffic of the target cell is 0 within a set reporting period. Specifically, whether the traffic of the cell is 0 may be determined comprehensively by measuring indicators of the cell in a period such as the number of RRC connection attempts, an RRC connection setup success rate, the number of RAB setup attempts, an RAB setup success rate, the number of active users, a wireless call drop/disconnection rate.

402. The eNB1 sends, to the OAM, an alarm or a notification indicating that the target cell becomes a potential outage cell, for example, "target cell unavailable".

403. The OAM selects, from a neighboring cell list of the target cell, a proper neighboring cell on which an auxiliary measurement needs to be performed. The criterion for selecting a neighboring cell is not limited. For example, a large quantity of UEs are handed over to a neighboring cell of the target cell during a recent period of time. The neighboring cell and the target cell may be intra-frequency cells, inter-frequency cells or inter-system cells.

404. The OAM sends a request message to the selected neighboring cell through a network management interface, where the request message includes one or more pieces of the following information: an identifier of the target cell, a longest measurement period, and a measurement item requested to be performed. The request message in this embodiment is exemplarily a "cell outage measurement request". For example, the "cell outage measurement request" carries an identifier of the target cell (mandatory), a measurement item requested to be performed (optional, including a performance measurement of the target cell, a measurement performed by a UE in the target cell, and the like), and a longest measurement period (mandatory). If the OAM is an NMS, the "cell outage measurement request" message may be implemented by using a specific operation message (for example, a "cell outage measurement" message) in a newly defined interface integration reference point (Interface Integration Reference Point, Interface IRP) of a northbound interface, or by adding a corresponding attribute to a cell object defined in an existing EUTRAN NRM IRP.

405 to 409 illustrated in FIG. 4 are similar to 304 to 308 illustrated in FIG. 3 respectively, and therefore are not repeated here.

410. The eNB2 returns a reply message to the OAM through a network management interface, where the reply message carries information obtained by a neighboring cell through auxiliary measurement and used to determine whether an outage occurs in the target cell, for example, qualitative information: an outage or non-outage of the target cell. In this embodiment, the foregoing reply message is exemplarily a "cell outage measurement reply". If the OAM is an NMS, the "cell outage measurement reply" message may be implemented by using a specific operation message (for example, a "cell outage measurement" message) in a newly defined interface integration reference point (Interface IRP) of a northbound interface, or by adding an attribute of a corresponding qualitative result to a cell object defined in an existing EUTRAN NRM IRP.

411. The OAM finally determines whether an outage occurs in the target cell by combining the cell outage measurement results (the qualitative information) reported by selected neighboring cells. For example, if all the selected neighboring cells return an indication of "target cell outage", the OAM determines that an outage occurs in the target cell and sends a corresponding alarm, for example, "target cell outage". Then, the process ends.

Therefore, the embodiment of the present invention provides a method where the base station initiates outage cell auxiliary measurements to selected neighboring cells on demand when the base station preliminarily discovers a possible outage of the target cell. The neighboring cells monitor UEs in performing auxiliary measurements on signal quality of the target cell and/or performance measurement indicators of the neighboring cells, thereby further enhancing the accuracy of an outage cell detection judgment. In another aspect, on demand (on demand) means that the trigger is an event that the base station preliminarily discovers a possible outage of the target cell. Measurement tasks of UEs in the neighboring cells do not impose heavy data load on an air interface, and the UEs can transfer required measurement data to a network quickly and efficiently.

Figure 5:
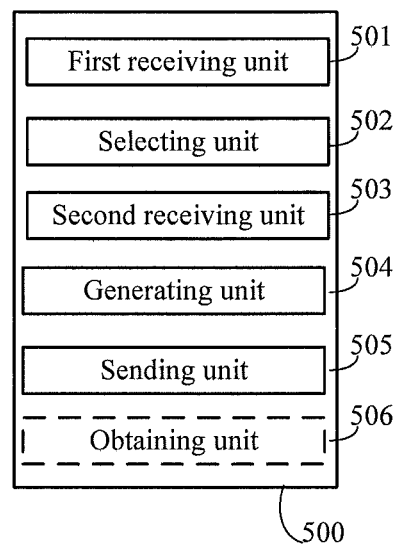
FIG. 5 is schematic block structural diagram of a base station according to an embodiment of the present invention.

FIG. 5 is schematic structural block diagram of a base station according to an embodiment of the present invention. The base station 500 illustrated in FIG. 5 is a controlling base station of a first cell and may be configured to implement operations of the controlling base station of the first cell in all the foregoing method embodiments. For details about the specific operation processes, reference may be made to the foregoing method embodiments, and details are not further described in this embodiment. The base station 500 includes a first receiving unit 501, a selecting unit 502, a second receiving unit 503, a generating unit 504, and a sending unit 505.

The first receiving unit 501 receives a request message, where the request message is used to request an outage measurement on a second cell, where the foregoing first cell is a neighboring cell of the second cell; the selecting unit 502 selects, according to the foregoing request message, a user equipment in the first cell to measure the second cell; the second receiving unit 503 receives measurement information obtained by the user equipment by measuring the second cell; the generating unit 504 generates, according to the measurement information, information used to determine whether an outage occurs in the second cell; and the sending unit 505 sends a reply message, where the reply message includes the information used to determine whether an outage occurs in the second cell.

Alternatively, as an embodiment, the foregoing request message may be initiated by a controlling base station of the second cell (that is, the target cell). The first receiving unit 501 is further configured to receive the request message sent by the controlling base station of the second cell; and the sending unit 505 is further configured to send the reply message to the controlling base station of the second cell.

Alternatively, as another embodiment, the foregoing request message may be initiated by a network management system independent of a base station on a unified basis for coordinating auxiliary measurement processes of neighboring cells. The first receiving unit 501 is further configured to receive the foregoing request message sent by the network management system; and the first sending unit 505 is further configured to send the foregoing reply message to the network management system.

Alternatively, as an embodiment, in each of the foregoing embodiments, the selecting unit 502 is further configured to select, from the first cell, a user equipment adjacent to the cell edge of the second cell to measure the second cell.

Alternatively, as an embodiment, in each of the foregoing embodiments, the base station 500 further includes: an acquiring unit 506, configured to acquire handover performance measurement information of the second cell, where the handover performance measurement information of the second cell includes one or more pieces of the following information: the number of handover requests with respect to the second cell, the number of successful handovers with respect to the second cell, a disconnection/call drop rate of the second cell. The generating unit 504 generates, according to the foregoing measurement information and the handover performance measurement information of the second cell, the information used to determine whether an outage occurs in the second cell.

The first receiving unit 501, the second receiving unit 503, the second receiving unit 503, and the sending unit 505 may be integrated in a transceiver device, or they may be different receiving interfaces and sending interfaces. The selecting unit 502 and the generating unit 504 each may be a processor.

FIG. 6 is schematic structural block diagram of a network device according to an embodiment of the present invention. The network device 600 illustrated in FIG. 6 includes a sending unit 601, a first receiving unit 602, and a processing unit 603.

When a second cell becomes a potential outage cell, the sending unit 601 sends a request message to a controlling base station of a first cell, where the request message is used to request an outage measurement on the second cell, so that the controlling base station of the first cell selects a user equipment in the first cell to measure the second cell and generates, according to measurement information obtained through the measurement, information used to determine whether an outage occurs in the second cell, where the first cell is a neighboring cell of the second cell; The first receiving unit 602 receives a reply message sent by the controlling base station of the first cell, where the reply message includes the information used to determine whether an outage occurs in the second cell. The processing unit 603 determines, according to the information used to determine whether an outage occurs in the second cell, whether an outage occurs in the second cell.

Alternatively, as an embodiment, the network device 600 may be a controlling base station of the second cell, and can perform operations of the controlling base station of the second cell in the foregoing method embodiments. For details about the specific operations, reference may be made to the foregoing method embodiments, and details are not further described here.

Alternatively, as an embodiment, the network device 600 may also be a network management system, and can perform operations of the network management system in the foregoing method embodiments. For details about the specific operations, reference may be made to the foregoing method embodiments, and details are not further described here.

If the network device is a network management system, the network device 600 further includes a second receiving unit 604 and a generating unit 605. The second receiving unit 604 receives indication information sent by the controlling base station of the second cell, where the indication information is used to indicate that the second cell becomes a potential outage cell; and the generating unit 605 generates, according to the foregoing indication information, the request message used to request an outage measurement on the second cell.

Alternatively, as an embodiment, the request message sent by the sending unit 601 in each of the foregoing embodiments includes one or more pieces of the following information: an identifier of the second cell, a longest measurement period, and a measurement item requested to be performed.

The sending unit 601, the first receiving unit 602, and the second receiving unit 604 may be integrated in a transceiver device, or they may be different receiving interfaces and sending interfaces. The processing unit 603 and the generating unit 605 each may be a processor.

An embodiment of the present invention also provides a communication system, where the communication system may include the base station provided in the embodiment illustrated in FIG. 5 and the network device provided in the embodiment illustrated in FIG. 6. The communication system may further include a user equipment in a cell controlled by the base station illustrated in FIG. 5.

By using the device and the system provided in the embodiments illustrated in FIG. 5 and FIG. 6, a user equipment in a neighboring cell (that is, the first cell) measures the target cell (that is, the second cell), and the controlling base station of the neighboring cell returns information used to determine whether an outage occurs in the target cell to the target cell according to a measurement result of the user equipment. In this way, the target cell implements, by using an auxiliary measurement result of the neighboring cell, outage detection on the target cell on a real-time basis, thereby increasing the efficiency and accuracy of outage cell detection.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for the detailed working processes of the foregoing system, apparatus, and unit, reference may be made to the corresponding processes in the foregoing method embodiments, and the details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash disk, a removable hard disk, a read-only memory (Read-Only Memory, ROM), a random access memory (Random Access Memory, RAM), a magnetic disk, or an optical disk.

The foregoing description is merely about specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for cell outage detection, comprising:
receiving, by a controlling base station of a first cell, a request message sent by a controlling base station of a second cell, wherein the request message is used to request an outage measurement on the second cell, wherein the first cell is a neighboring cell of the second cell;
selecting, by the controlling base station of the first cell according to the request message, a user equipment in the first cell to measure the second cell;
receiving, by the controlling base station of the first cell, measurement information obtained by the user equipment by measuring the second cell, and generating, according to the measurement information, information used to determine whether an outage occurs in the second cell; and
sending, by the controlling base station of the first cell, a reply message to the controlling base station of the second cell, wherein the reply message comprises the information used to determine whether an outage occurs in the second cell.

2. The method according to claim 1, wherein the request message comprises one or more pieces of the following information: an identifier of the second cell, a longest measurement period, and a measurement item requested to be performed.

3. The method according to claim 1, wherein the selecting a user equipment in the first cell to measure the second cell comprises:
selecting, from the first cell, a user equipment adjacent to a cell edge of the second cell to measure the second cell.

4. The method according to claim 1, wherein, the method further comprises: acquiring, by the controlling base station of the first cell, handover performance measurement information of the second cell, wherein the handover performance measurement information of the second cell comprises one or more pieces of the following information: the number of handover requests with respect to the second cell, the number of successful handovers with respect to the second cell, a disconnection/call drop rate of the second cell; and
the generating, according to the measurement information, information used to determine whether an outage occurs in the second cell comprises: generating, according to the measurement information and the handover performance measurement information of the second cell, the information used to determine whether an outage occurs in the second cell.

5. The method according to claim 1, wherein the measurement information obtained by the user equipment by measuring the second cell comprises:

measurement information obtained by the user equipment by measuring a reference signal receiving power signal of the second cell or measurement information obtained by the user equipment by detecting an uplink channel and a downlink channel of the second cell.

6. A method for cell outage detection, comprising:
sending a request message to a controlling base station of a first cell when a second cell becomes a potential outage cell, wherein the request message is used to request an outage measurement on the second cell, so that the controlling base station of the first cell selects a user equipment in the first cell to measure the second cell and generates, according to measurement information obtained through the measurement, information used to determine whether an outage occurs in the second cell, wherein the first cell is a neighboring cell of the second cell;
receiving a reply message sent by the controlling base station of the first cell, wherein the reply message comprises the information used to determine whether an outage occurs in the second cell; and
determining, according to the information used to determine whether an outage occurs in the second cell, whether an outage occurs in the second cell; wherein, the method is executed by a network management system, the method further comprises:
receiving, by the network management system, indication information sent by the controlling base station of the second cell, wherein the indication information is used to indicate that the second cell becomes a potential outage cell; and
generating, by the network management system, according to the indication information, the request message used to request an outage measurement on the second cell.

7. The method according to claim 6, wherein the request message comprises one or more pieces of the following information: an identifier of the second cell, a longest measurement period, and a measurement item requested to be performed.

8. A base station, wherein the base station is a controlling base station of a first cell and comprises:
a first receiving unit, configured to receive a request message sent by a controlling base station of a second cell, wherein the request message is used to request an outage measurement on the second cell, wherein the first cell is a neighboring cell of the second cell;
a selecting unit, configured to select, according to the request message, a user equipment in the first cell to measure the second cell;
a second receiving unit, configured to receive measurement information obtained by the user equipment by measuring the second cell;
a generating unit, configured to generate, according to the measurement information, information used to determine whether an outage occurs in the second cell; and
a sending unit, configured to send a reply message to the controlling base station of the second cell, wherein the reply message comprises the information used to determine whether an outage occurs in the second cell.

9. The base station according to claim 8, wherein:
the selecting unit is further configured to select, from the first cell, a user equipment adjacent to a cell edge of the second cell to measure the second cell.

10. The base station according to claim 8, further comprising: an acquiring unit, configured to acquire handover performance measurement information of the second cell, wherein the handover performance measurement information of the second cell comprises one or more pieces of the following information: the number of handover requests with respect to the second cell, the number of successful handovers with respect to the second cell, a disconnection/call drop rate of the second cell;
wherein the generating unit is further configured to generate, according to the measurement information and the handover performance measurement information of the second cell, the information used to determine whether an outage occurs in the second cell.

11. The base station according to claim 8, wherein:
the selecting unit is configured to elect, according to the request message, multiple user equipments in the first cell to measure the second cell;
the second receiving unit is configured to receive measurement information obtained by the multiple user equipment by measuring the second cell; and
qualitative information used by the generating unit to determine that a target cell is an non-outage cell is generated if at least one user equipment returns a normal measured value in the measurement information and qualitative information used to determine that the target cell is a outage cell is generated if all selected user equipments return abnormal measured value in the measurement information.

12. A network device, comprising:
a sending unit, configured to: send a request message to a controlling base station of a first cell when a second cell becomes a potential outage cell, wherein the request message is used to request an outage measurement on the second cell, so that the controlling base station of the first cell selects a user equipment in the first cell to measure the second cell and generates, according to measurement information obtained through the measurement, information used to determine whether an outage occurs in the second cell, wherein the first cell is a neighboring cell of the second cell;
a first receiving unit, configured to receive a reply message sent by the controlling base station of the first cell, wherein the reply message comprises the information used to determine whether an outage occurs in the second cell; and
a processing unit, configured to determine, according to the information used to determine whether an outage occurs in the second cell, whether an outage occurs in the second cell;
wherein the network device is a network management system, the network device further comprises:
a second receiving unit, configured to receive indication information sent by the controlling base station of the second cell, wherein the indication information is used to indicate that the second cell becomes a potential outage cell; and
a generating unit, configured to generate, according to the indication information, the request message used to request an outage measurement on the second cell.

13. The network device according to claim 12, wherein the request message sent by the sending unit comprises one or more pieces of the following information: an identifier of the second cell, a longest measurement period, and a measurement item requested to be performed.

14. A method for cell outage detection, comprising:
receiving, by a controlling base station of a first cell, a request message sent by a controlling base station of a second cell, wherein the request message is used to request an outage measurement on the second cell, wherein the first cell is a neighboring cell of the second cell;

selecting, by the controlling base station of the first cell according to the request message, multiple user equipments in the first cell to measure the second cell;

receiving, by the controlling base station of the first cell, measurement information obtained by the multiple user equipments by measuring the second cell, and generating, according to the measurement information, information used to determine whether an outage occurs in the second cell, wherein the controlling base station generates qualitative information used to determine that a target cell is an non-outage cell if at least one user equipment returns a normal measured value in the measurement information and the controlling base station generates qualitative information used to determine that the target cell is a outage cell if all selected user equipments return abnormal measured value in the measurement information; and sending, by the controlling base station of the first cell, a reply message to the controlling base station of the second cell, wherein the reply message comprises the information used to determine whether an outage occurs in the second cell.

15. The method according to claim 14, wherein, the method further comprises:

acquiring, by the controlling base station of the first cell, handover performance measurement information of the second cell, wherein the handover performance measurement information of the second cell comprises one or more pieces of the following information: the number of handover requests with respect to the second cell, the number of successful handovers with respect to the second cell, a disconnection/call drop rate of the second cell; and the generating, according to the measurement information, information used to determine whether an outage occurs in the second cell comprises: generating, according to the measurement information and the handover performance measurement information of the second cell, the information used to determine whether an outage occurs in the second cell.

16. A method for cell outage detection executed by a network management system that comprises:

sending a request message to controlling base stations of selected first cells when a second cell becomes a potential outage cell, wherein the request message is used to request an outage measurement on the second cell, so that the controlling base station of the first cell selects a user equipment in the first cell to measure the second cell and generates, according to measurement information obtained through the measurement, information used to determine whether an outage occurs in the second cell, wherein the first cell is a neighboring cell of the second cell;

receiving a reply message sent by the controlling base station of the first cell, wherein the reply message comprises the information used to determine whether an outage occurs in the second cell; and determining, according to the information used to determine whether an outage occurs in the second cell, whether an outage occurs in the second cell; wherein it is determined that an outage occurs in the second cell if all the selected first cells return the information indicating cell outage.

17. The method according to claim 16, further comprises:

receiving, by the network management system, indication information sent by the controlling base station of the second cell, wherein the indication information is used to indicate that the second cell becomes a potential outage cell; and generating, by the network management system, according to the indication information, the request message used to request an outage measurement on the second cell.

18. A network management system, comprising:

a sending unit, configured to: send a request message to controlling base stations of selected first cells when a second cell becomes a potential outage cell, wherein the request message is used to request an outage measurement on the second cell, so that the controlling base station of the first cell selects a user equipment in the first cell to measure the second cell and generates, according to measurement information obtained through the measurement, information used to determine whether an outage occurs in the second cell, wherein the first cell is a neighboring cell of the second cell;

a first receiving unit, configured to receive a reply message sent by the controlling base station of the first cell, wherein the reply message comprises the information used to determine whether an outage occurs in the second cell; and a processing unit, configured to determine, according to the information used to determine whether an outage occurs in the second cell, whether an outage occurs in the second cell, wherein it is determined that an outage occurs in the second cell if all the selected first cells return the information indicating cell outage.

19. The network management system according to claim 18, further comprises:

a second receiving unit, configured to receive indication information sent by the controlling base station of the second cell, wherein the indication information is used to indicate that the second cell becomes a potential outage cell; and a generating unit, configured to generate, according to the indication information, the request message used to request an outage measurement on the second cell.

* * * * *